Oct. 11, 1927.
R. L. DEZENDORF
1,645,321
METERS AND INDICATING MEANS THEREFOR
Filed Dec. 2, 1925    2 Sheets-Sheet 2
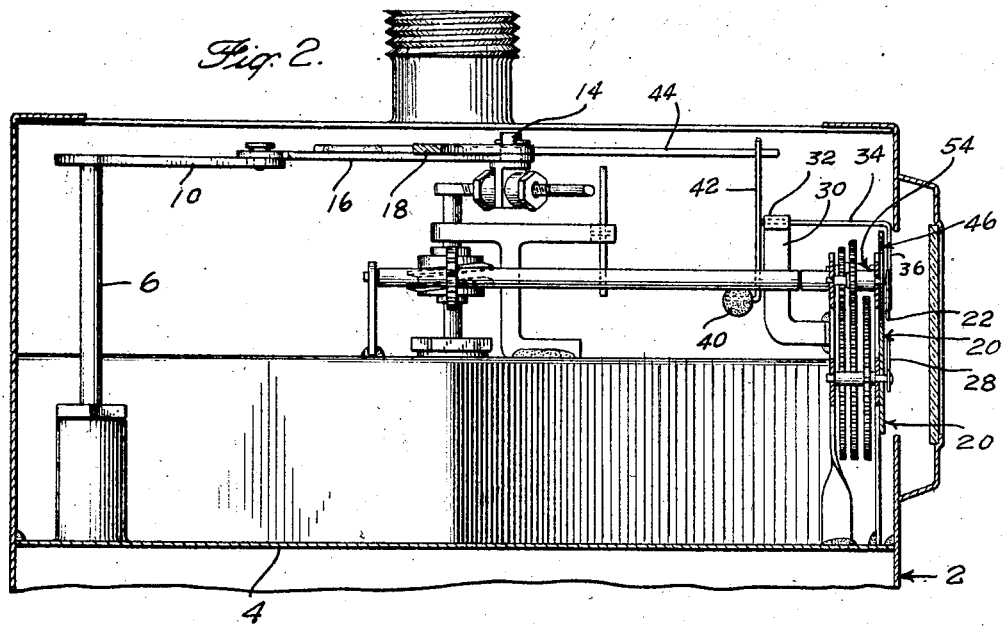
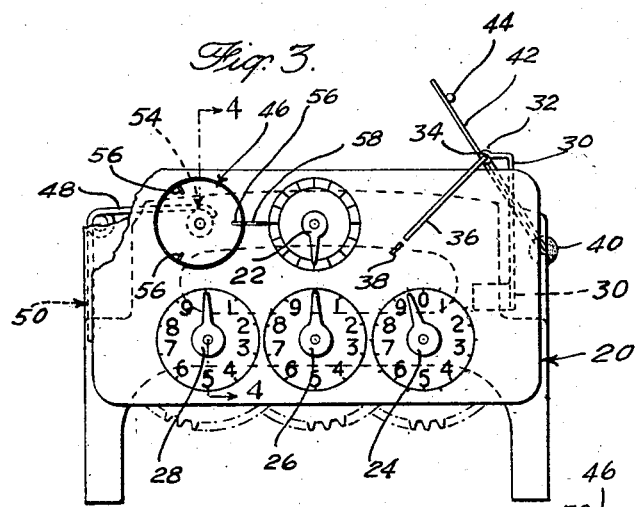
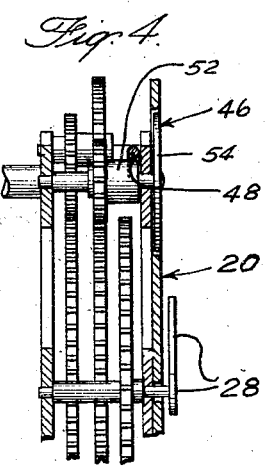
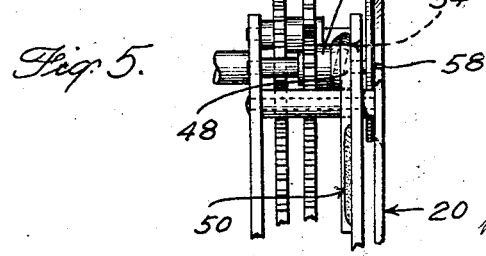
INVENTOR
R. L. DEZENDORF
BY
ATTORNEYS Patented Oct. 11, 1927.

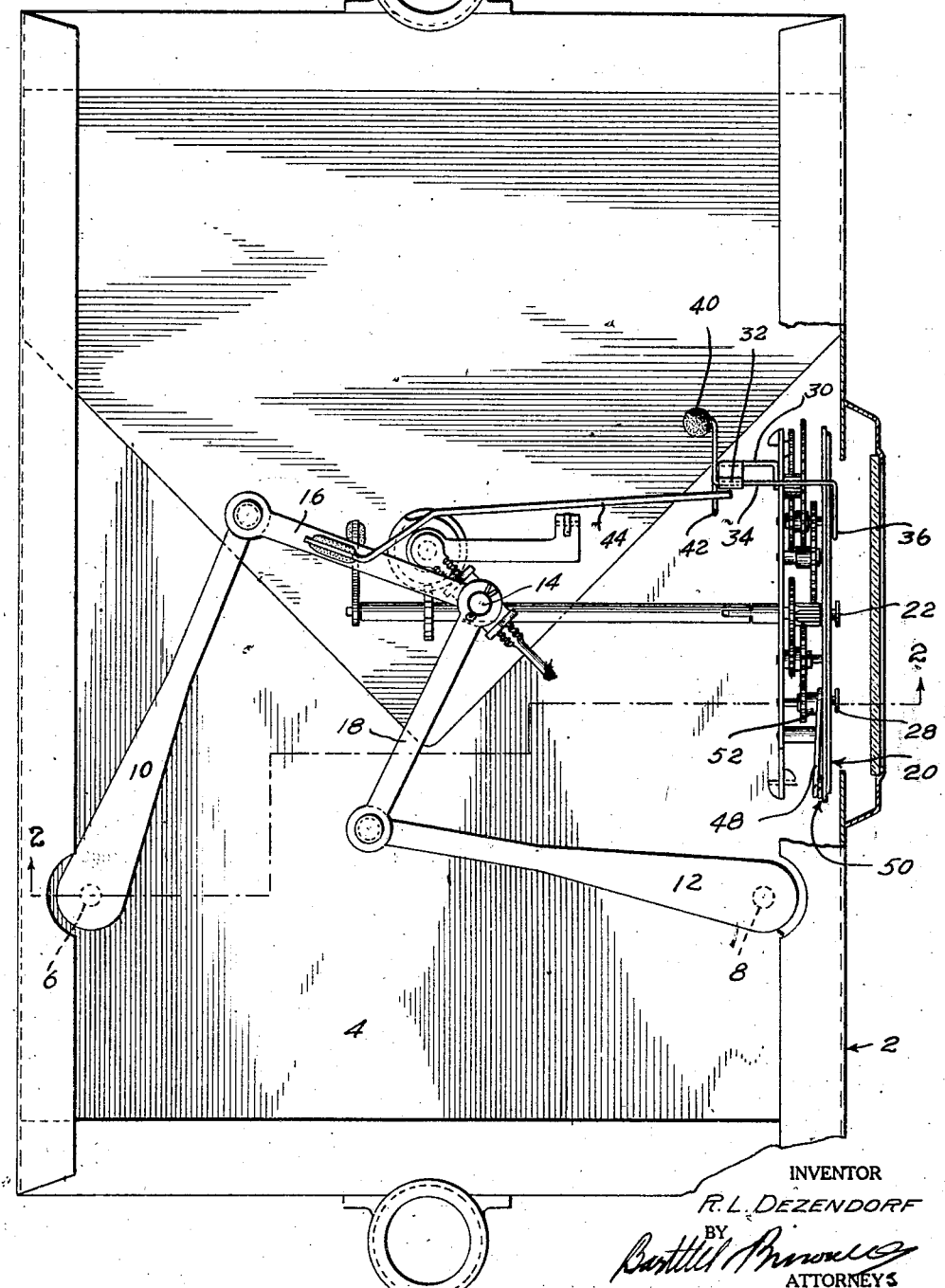

1,645,321

UNITED STATES PATENT OFFICE.

RICHARD LEE DEZENDORF, OF RICHMOND HILL, NEW YORK.

METER AND INDICATING MEANS THEREFOR.

Application filed December 2, 1925. Serial No. 72,641.

My invention relates to new and improved indicating means for meters. It is especially adapted for gas meters of the ordinary type having actuating bellows, front and rear flag wires actuated thereby, through upper and lower flag arms, and has for its object to produce a new and improved sensitive indicating means, which will indicate clearly upon the passage of a comparatively small amount of gas through the meter. Heretofore the indicators on gas meters generally used have moved at a comparatively slow rate, relatively to the amount of gas passing, with the result that a comparatively large amount of air or gas is required for the testing of a meter. For this reason considerable time is required to test meters equipped with the present indicating devices.

The purpose of my invention is to provide a novel, simple and accurate indicating means which will avoid the difficulties referred to and enable a meter to be quickly and accurately tested.

The following is a description of an embodiment of my invention reference being had to the accompanying drawings, in which:

Figure 1 shows a plan view of a meter embodying my invention with its top plate removed;

Fig. 2 is a section of the same on the line 2—2, Fig. 1;

Fig. 3 is a front view of the dial indicating means somewhat enlarged, a portion of the dial being broken away;

Fig. 4 is a section on the line 4—4, Fig. 3; and

Fig. 5 is a similar section of a modification.

Referring more particularly to the drawings, 2 is the meter casing having the gallery 4 containing the usual rear flag wire 6 and front flag wire 8 to which are connected, respectively, lower flag arms 10 and 12, which are connected to the tangent 14 by upper flag arms 16 and 18, in the ordinary manner. 20 is the dial of an indicator having the usual two foot indicator pointer 22 and the usual pointers 24, 26 and 28 for indicating in their respective revolutions, one thousand feet, and ten thousand feet, and one hundred thousand feet, respectively, and for partial revolutions the various tenths thereof. None of these usual indicators, however, move rapidly enough for indicating the small amount of gas desirable for a quick test.

My invention comprises supplementing these indicators with an oscillating indicator. It also comprises the addition of a more quickly indicating revolving indicating member which synchronizes with the oscillating indicator member. In embodying my invention, I secure to the rear side of the main indicator frame, by solder or otherwise, a vertically extending bearing member 30 having a horizontal bearing 32 in which is mounted a shaft 34 having a radially pointing indicating portion 36 which when actuated moves across the face of the dial plate, said dial plate being provided with an indicating mark 38. The rear end of the shaft 34 is provided with a cross head having a downwardly projecting portion on which is mounted a weight 40 and an upwardly projecting portion 42 which is actuated by some one of the rapidly moving parts of the meter. In order to actuate the shaft 34 I provide one of those rapidly moving parts with an extension 44 having a movement through a given path during each revolution of the tangent and so located that the portion 42 of the cross head lies in the path of such movement so as to be engaged and disengaged thereby and moved during each revolution of the tangent. I preferably secure the extension 44 to the lower flag arm 16 which is directly connected with the upper flag arm 10 secured to the rear flag wire 6.

As the gas passes through the meter the extension 44 moves rapidly and during each revolution of the tangent engages the upper end 42 of the cross head, lifting the weight 40 and moving the indicator 36 with a quick movement and then disengages the portion 42, permitting the weight 40 to return the end 36 to its normal position. The quick movement thus imparted to the indicating portion 36 during each revolution of the tangent enables a test reading of the meter to be quickly taken, thus saving time and insuring accuracy in the reading.

In order to provide supplemental means cooperating with said quick reading oscillating means, I provide a supplemental high speed revolving indicator 46, preferably in the form of a disk lying approximately in the plane of the indicator dial and geared to the shaft of the indicating pointer 22 by a series of reducing gearing, as shown in Fig. 1. This series of gearing is separate and distinct from the series of gearing actuating the pointers 24, 26 and 28 although geared thereto. In order to prevent back lash of this quick moving indicator 46 I provide a brake consisting of a spring 48 having its lower end secured to the rear frame at 50 and its braking end resting upon an enlargement 52 on the shaft to which the indicator 46 is connected, so as to make frictional engagement therewith, as indicated at 54, in Fig. 3. This supplemental revolving indicator is preferably in the form of a disk which may lie within an opening in the dial 20, as indicated in Fig. 4, or may lie close behind that opening as indicated in Fig. 5, so as to be substantially in the plane of the dial, the dial being thin and having a bevelled edge carrying the indicating mark 58. In the latter case the disk may be larger than the opening in the dial, as shown in Fig. 5, in which case I make a portion of the face of the disk have a rubbing contact on the rear surface of the dial so that the contact portions of the disk and dial constitute a brake. In this case the spring brake 48 may be omitted.

When an indicating disk is used it is provided with a plurality of graduation marks 56 equally spaced, one of which is opposite an indicating mark 58 upon the dial, when the indicator 36 is opposite its indicating mark 38 as shown in Fig. 3.

The indicating mark 58 I place in a horizontal plane passing through the axis of the shaft of the indicator 46. Placing the mark in that plane enables a more easy and accurate reading of the indications of the indicator 46.

With the ordinary meter the tangent makes three revolutions for each half foot of gas passing, and I, therefore provide the indicating disk 46 with three indicating marks spaced at equal distances.

This indicating disk 46 in itself is accurate enough for some purposes, but for other purposes the quicker acting indicator 36 is desirable. The two indicators 36 and 46 check each other up and if it is desired to make a reading of the indicator 36 after two or three movements instead of after one movement the indicator 46 enables the operator to keep track of the number of movements of the indicator 36 between readings.

By the means above described, simple and accurate indicating means indicating at frequent intervals and with small amounts of gas are attained, thus enabling the testing of the meter under varying conditions of load in an accurate and expeditious manner.

As will be evident to those skilled in the art, my invention permits various modifications without departing from the spirit thereof or the scope of the appended claims.

What I claim is:

1. In a gas meter having front and rear flag wires, a revolving shaft, and members operatively connecting said flag wires and said revolving shaft, comprising upper flag arms and lower flag arms, the combination of an extension from one of said members and a visible gravity retracted indicator having a portion lying in the path of said extension so as to be engaged and disengaged and moved by said extension during each revolution of said shaft.

2. In a gas meter having front and rear flag wires, a revolving shaft and members operatively connecting said flag wires and said revolving shaft, comprising upper flag arms and lower flag arms, the combination of an extension from one of the lower flag arms and a visible gravity retracted indicator having a portion lying in the path of said extension so as to be engaged and disengaged and moved by said extension during each revolution of said shaft.

3. In a gas meter having front and rear flag wires, a revolving shaft and members operatively connecting said flag wires and said revolving shaft, comprising upper flag arms and lower flag arms, the combination of an extension of the flag arm connecting the rear flag wire with said tangent and a visible gravity retracted indicator having a portion lying in the path of said extension so as to be engaged and disengaged and moved by said extension during each revolution of said shaft.

In testimony whereof, I have signed my name to this specification this 24th day of November, 1925.

RICHARD LEE DEZENDORF.